(12) United States Patent
Schnitzer

(10) Patent No.: US 8,190,663 B2
(45) Date of Patent: May 29, 2012

(54) METHOD AND A SYSTEM FOR IDENTIFYING SIMILAR AUDIO TRACKS

(75) Inventor: Dominik Schnitzer, Vienna (AT)

(73) Assignee: Osterreichisches Forschungsinstitut fur Artificial Intelligence der Osterreichischen Studiengesellschaft fur Kybernetik of Freyung, Vienna (AT)

( * ) Notice: Subject to any disclaimer, the term of this patent is extended or adjusted under 35 U.S.C. 154(b) by 274 days.

(21) Appl. No.: 12/458,230

(22) Filed: Jul. 6, 2009

(65) Prior Publication Data

US 2011/0004642 A1 Jan. 6, 2011

(51) Int. Cl.
*G06F 17/00* (2006.01)
(52) U.S. Cl. ......... 707/912; 707/705; 707/802; 707/955
(58) Field of Classification Search .................. None
See application file for complete search history.

(56) References Cited

U.S. PATENT DOCUMENTS

| | | | | |
|---|---|---|---|---|
| 6,675,174 | B1* | 1/2004 | Bolle et al. | 1/1 |
| 2005/0177372 | A1 | 8/2005 | Wang et al. | |
| 2006/0095852 | A1* | 5/2006 | Trepess et al. | 715/741 |
| 2007/0055500 | A1 | 3/2007 | Bilobrov | |
| 2007/0174274 | A1 | 7/2007 | Kim et al. | |
| 2008/0189330 | A1* | 8/2008 | Hoos et al. | 707/104.1 |
| 2008/0249644 | A1* | 10/2008 | Jehan | 700/94 |
| 2010/0275158 | A1* | 10/2010 | Madsen | 715/810 |
| 2010/0325135 | A1* | 12/2010 | Chen et al. | 707/759 |
| 2011/0060738 | A1* | 3/2011 | Gates et al. | 707/737 |

FOREIGN PATENT DOCUMENTS

WO    WO 2009/001202    12/2008

OTHER PUBLICATIONS

Bjorn Schuller et al., :Tango or Waltz?: Putting Ballroom Dance Style into Tempo Detection, *Eurasip J. on Audio, Speech and Music Proc.*, vol. 2008, pp. 1-12, Article IDS 846135, (2008).
Jesper H. Jensen et al., "A Chroma-Based Tempo-Insensitive Distance Measure for Cover song Identification," (2007).
Daniel P.W. Ellis, "Beat Tracking by Dynamic Programming," LabROSA, Columbia University, New York, Jul. 16, 2007.
Yuan-Yuan Shi et al., :Log-scale Modulation Frequency Coefficient: A Tempo-Feature for Music Emotion Classification, *Learning the Semantics of Audio Signals*, pp. 12-21 (2006).

(Continued)

*Primary Examiner* — Shyue Jiunn Hwa
(74) *Attorney, Agent, or Firm* — Harness, Dickey & Pierce, P.L.C.

(57) ABSTRACT

In order to be able to handle very large numbers of tracks in a similarity determination in order to identify tracks similar to a predetermined track, a filtering method is used in order to identify a number of closest neighbor candidates between which the correct nearest neighbors are determined. Thus, the computationally heavy similarity determination is performed only on a subset of the tracks.
This filtering step may be a fastmap determination of the tracks where the pivot points are determined not as the extreme points along the to individual dimension but at the median thereof in order to avoid extremely high divergence values. This helps preserving the neighborhoods. Also, the mapping is performed on the basis of a square-rooted Symmetric Kullback-Leibler (SKL) divergence which is more metric than the SKL and thus provides a better mapping.

13 Claims, 5 Drawing Sheets

OTHER PUBLICATIONS

Christos Faloutsos et al., : FastMap; A Fast Algorithm for Indexing, Data-Mining and Visualization of Traditional and Mutlimedia Datasets, (1995).

Dominik Schnitzer et al., "A Filter-and-Refine Indexing Method for Fast Similarity Search in Millions of Music Tracks," (2009).

Elias Pampalk et al., :Exploring Music Collections by Browsing Different Views, (2003).

Kris West "Novel techniques for Audio Music Classification and Search," (thesis) School of computing Sciences University of East Anglia, Sep. 2008.

Daniel P.W. Ellis et al, "Identifying 'Cover Songs' with Chroma Features and Dynamic Programming Beat Tracking," LabROSA Dept. of Electrical Engineering, Columbia University, 2007, pp. 1429-1432.

Jesper H. Jensen et al., "A Tempo-Insensitive Distance Measure for Cover Song Identification Based on Chroma Features," Dept. of Electronics Systems Denmark and LabROSA Dept. of Electrical Engineering, Columbia University USA, 2008, pp. 2209-2212.

Elias Pampalk et al., Austrian Research Institute and Dept. of Software Technology, Vienna University, Vienna, Austria, "Content-based Organization and Visualization of Music Archives," 2002, pp. 570-579.

Shoichiro Saito et al., "Specmurt Analysis of Multi-Pitch Music Signals with Adaptive Estimation of Common Harmonic Structure," Queen Mary, University of London, 2005.

Andre Holzapfel et al., "Scale Transform in Rhythmic Similarity of Music," Institute of Electrical and Electronics Engineers, 2009.

Jinhua Lin "Divergence Measurements Based on the Shannon Entropy," Institute of Electrical and Electronics Engineers, Transactions on Information Theory, 37:145-151, 1991.

Dan-Ning Jiang et al., "Music Type Classification by Spectral Contrast Feature," IEEE Int'l Conference on Multimedia and Expo (ICME), Lausanne (Switzerland), Aug. 2002.

Jean-Julien Aucouturier et al., "Improving Timbre Similarity: How High is the Sky?" Journal of Negative Results in Speech and Audio Sciences 2004.

Nogutaka Ono et al., "A Real-Time Equalizer for Harmonic and Percussive Components in Music Signals," Proc. Int'l Conference on Musical Information Retrieval (ISMIR '08), Philadelphia, PA, USA Sep. 2008.

Helge Homburg et al., "A Benchmark Dataset for Audio Classification and Clustering," Proc. Int'l Conference on Music Information Retrieval (ISMIR '05) 2005.

J. Ma et al., "A Dynamic Merge-or-Split Learning Algorithm on Gaussian Mixture for Automated Model Selection," Proceedings of $6^{th}$ Int'l Conference on Intelligent Data Engineering and Automated Learning—Ideal, p. 203-210, Brisbane, Australia, Jul. 6-8, 2005.

European Examination Report dated Jan. 24, 2012 for EP Application No. 10167208.7—2201.

* cited by examiner

METHOD AND A SYSTEM FOR IDENTIFYING SIMILAR AUDIO TRACKS

The present invention relates to a system and a method for identifying audio tracks similar to a predetermined or identified/selected audio track and in particular to a system and method able to handle today's very large numbers of available audio tracks.

Today an unprecedented amount of music is available online. As of April 2009, the Apple iTunes music store alone lists more than 10 million downloadable songs in its catalogue. Other online music stores like Amazon MP3 still offer a 5 million songs catalogue to choose from. With the catalogue numbers constantly reaching new record highs, the need for intelligent music search algorithms that provide new ways to discover and navigate music is apparent.

Unfortunately, many of the intelligent music processing algorithms that have been published do not easily scale to the millions of music pieces available in an online music store. In particular, this is true for music recommendation algorithms which compute acoustic music similarity using a Gaussian timbre representation and the Kullback-Leibler divergence.

Especially the Kullback-Leibler divergence poses multiple challenges when developing a large scale music recommendation system: (1) the divergence is very expensive to compute, (2) it is not a metric and thus makes building indexing structures around it very hard and (3) in addition, the extracted acoustic music similarity features have a very high degree of freedom, which too is a general problem for indexing solutions ("curse of dimensionality").

But on the other hand, systems using this technique regularly rank in the very top places in the yearly MIREX Automatic Music Recommendation evaluations, which makes them a tempting but challenging target for broad usage in real applications.

In a first aspect, the invention relates to a method of identifying one or more audio tracks similar to a predetermined audio track, each track being represented by a set of n coefficients or values, the method comprising
1. generating a vector representation of the set of each audio track so as to determine a vector for each audio track,
2. determining a distance, in the vector representation, from the vector of the predetermined audio track to each vector of one or more of the other tracks,
3. identifying a predetermined number of the other tracks by selecting a predetermined number of vectors having the smallest distances to the vector of the predetermined track, and
4. performing a similarity determination between the predetermined track and the identified other tracks and identifying the one or more similar tracks.

In this aspect, similarity may be determined in a number of manners, from the very simple determination of an artists gender, age, skin colour, a style of music (jazz, pop, hiphop etc), or more complex parameters, such as beat-per-minute, rhythm, key, which instruments are used, or the like. A large number of such parameters or values are known, such as the so-called Gaussian timbre representation, or the Fluctuation Patterns rhythm representations. Other methods are simple audio similarity features like: the spectral centroid, spectral rolloff, spectral flux, zero crossings, beat histogram or pitch histogram features. These simple audio features are often combined into a single large music similarity feature vector.

Usually, a method of the present type is used or useful when a user listens to or experiences music or an audio track and then wishes to experience, buy, download, access or listen to similar music. In this situation, parameters representing the actual track are determined or accessed and used for identifying similar tracks.

Alternatively, a collection of tracks may be ordered according to similarity so as to generate a better overview thereof. Then, different parameters or aspects may be used for generating different orderings of such similarities.

It is noted that two tracks may be similar in one respect and different in another. Thus, similarity relates to one or more aspects or parameters of a track and usually not all aspects or parameters thereof.

Naturally, such parameters of the track may be represented in any number of manners and using any number of parameters or values. Any type of representation, be it a bpm or a distribution of some type, may be represented by one or more coefficients or values. Typical representations are mentioned further above. A track may be represented by some parameters for use in one type of similarity determination and other parameters for use in another type of similarity determination and/or parameters for use in informing a user or listener of an identity of the actual track (performer, artist, producer, label, etc.).

Naturally, a vector representation is the generation of an n-dimensional space and the representation of the set of parameters/values of each track therein. The number of dimensions of the vector space may be higher or lower than the number of parameters of the set. Also, the parameters/values of the set need not be metric, so that it is not required that a certain difference between values of three different tracks automatically makes all three tracks evenly similar, as this may be handled by the representation or mapping into the vector space.

When representing a track in the vector space, the representation will be a point and thus a vector in the vector space, as the track will have one value for each dimension of the vector space.

This mapping of values into a vector space may be performed in a large number of manners, such as using the below-mentioned FastMap method.

Having obtained the vector representation, distances may be determined between pairs of vectors, such as using the known Euclidian distance. A vast number of other distance measures may also be used, such as the Cosine Distance.

Each distance measure has its advantages and disadvantages.

In order to obtain the best filtering, preferably, the distance is determined from the vector representing the predetermined audio track to all other tracks, whereby a coarse filtering may be performed to remove a number of the most distant points.

This filtering results in the identification of a predetermined number of the other tracks. This number may be an exact number, such as 10,000 or 100,000 tracks, or may be a percentage of all available tracks. Alternatively, all tracks having a vector within a predetermined distance may be identified, as may all tracks having a vector within a distance being a percentage of e.g. a maximum distance to all vectors or within a median of the distribution of distances. Any measure may be used for identifying a sub-group of the available tracks.

Having identified a sub-group of tracks using the above, usually more coarse, filtering, a similarity determination is then performed between the predetermined track and the identified other tracks. This similarity determination may be performed any desired similarity or divergence method. As the number of such determinations has been reduced by the first filtering step, more computationally heavy methods may be available without detrimental effect on the overall functionality.

Preferred similarity measures are mentioned further below.

The final step is to identify, from the similarity determination, the one or more similar tracks which the user may then purchase, download, listen to, access, forward or the like.

In a preferred embodiment, step 1 comprises mapping the sets into a k-dimensional Euclidean vector space by:
   for each dimension, k, identifying two pivot points and calculating the vector for each set on the basis of the identified pivot points.

This may be the usual FastMap routine, where the pivot points are used for determining the dimension, and where the actual position or vector, when all pivot points have been identified, is determined on the basis of these pivot points. Thus, the pivot points are sets of parameters/values (or tracks) positioned, in relation to each other, along the pertaining dimension. The FastMap routine is well-known and is described further below.

Hitherto, a large overall precision in the mapping and determination of the pivot points has been sought for by identifying, as the pivot points, two points positioned as far from each other as possible along the dimension. Usually, two extreme positions are determined. This, however, has disadvantages and is not required, when the major concern is that of the neighbourhoods and not the full span of the vector space. In this respect, a neighbourhood is the relative positions and distances between similar tracks in the vector space.

Thus, the two pivot points may be identified by:
a) selecting one of the sets,
b) determining, for each other set than the selected set, a first distance, along the pertaining dimension, from the selected set to the other set,
c) selecting a first pivot point as a set having a first distance less than 90% of the largest determined first distance,
d) determining, for each other set than that of the selected first pivot point, a second distance, along the pertaining dimension, from the selected first pivot point to the other set,
e) selecting a second pivot point as a set having a second distance less than 90% of the largest determined second distance.

Usually, step a) will comprise selecting a set from all sets including the set of the predetermined track. This set may be randomly selected.

Thus, the selecting the pivot points is performed not using points/sets at the extreme positions (largest distances). Naturally, the pivot points may be selected having first/second distances less than 85%, such as less than 80% of the largest first/second distance, respectively.

It has been found that the neighbourhoods are better preserved, if the pivot points are selected at or near a median/mean/middle of the first/second distances, such as within the 25% and 75% quartiles of the distribution of the first/second distances, respectively.

Actually, it is preferred that the first pivot point is selected as a set having a first distance at or near a median/mean/middle of the first distances and the second pivot point is selected as a set having a second distance at or near a median/mean/middle of the second distances.

Naturally, the first and second distances preferably relate to similarity of the pertaining tracks, a low distance indicating a high similarity, as the filtering step of selecting points/vectors/sets/tracks with small distances to the point/vector of the predetermined track will then result in the identification of tracks with a minimum similarity to the predetermined track.

A large number of similarity determining or estimating methods exist, as is also described above, such as Gaussian timbre models, rhythmic structures, fluctuation patterns, the Kullback-Leibler divergence, or any combination thereof.

Presently, it is preferred that steps b) and e) comprise determining the distance on the basis of a Kullback-Leibler (KL) divergence between the two pertaining sets. Presently, the KL provides the best similarity estimations known.

In order to maintain symmetry in the determinations, it is preferred that the distances are determined on the basis of the symmetric KL (SKL).

In the preferred embodiment, the vector is calculated on the basis of a square root of a symmetric Kullback-Leibler divergence between the pertaining sets. Taking the square root, it has been found, makes the KL more metric, whereby the individual distances used in the vector mapping will be more reliable, and the nearest neighbours selected in step 3 will then with a higher certainty comprise the real nearest neighbours (most similar tracks) available.

Naturally, having identified the predetermined number of candidates for the similar tracks, the actual similarity determination may be performed using any of the above similarity measures.

Presently, as mentioned above, it is preferred that step 4, comprises determining the similarity by determining a Kullback-Leibler divergence between the sets of the predetermined track and each of the identified other tracks. Again, it may be desired to use the SKL, as this is symmetric.

In another aspect, the present invention relates to an apparatus for identifying a one or more audio tracks similar to a predetermined audio track, the apparatus comprising:
   means for accessing a plurality of sets of n coefficients or values, each set representing an audio track,
   means for identifying a predetermined audio track,
   means for generating a vector representation of the set of each audio track so as to determine a vector for each audio track,
   means for determining a distance, in the vector representation, from the vector of the predetermined audio track to each vector of one or more of the other tracks,
   means for identifying a predetermined number of the other tracks by selecting a predetermined number of vectors having the smallest distances to the vector of the predetermined track, and
   means for performing a similarity determination between the predetermined track and the identified other tracks and identifying the one or more similar tracks.

In order to be able to determine the similarity between audio tracks, information is derived from the tracks in order to make them comparable. This information may be derived in a number of manners, some of which are described above.

The available tracks may be only tracks which the user owns or has the rights to access or may also include tracks not readily available but which may be made available such as by purchase.

This information (these sets of information) may be available or accessible either from local or remote storages independently of the actual audio tracks. Databases may be provided with such sets of data in order to facilitate identification of interesting audio tracks which may then be accessed or purchased from other sources.

The sets of data may also be derived from the audio tracks if available. It is noted that the full audio track may not be needed for deriving the desired set of data. A number of methods are available which only need a small part, a so-called snippet, to derive the desired parameters/values.

Naturally, audio tracks may be accessed or listened to in a variety of manners. Streaming radio from airborne signals or e.g. the WWW may be received and listened to as well as stored for later use. Audio tracks may be purchased on storage media as well as downloaded from e.g. the WWW. Tracks may be available on a storage medium (ROM, RAM, hard disc, floppy disc, Flash memory or other portable memory media or the like) either in the possession of a user or remotely, such as accessible via LAN, WAN or the WWW. The available tracks may be owned by the user or may be available for free use or for purchase (for leasing or indefinite ownership). Naturally, a combination of all these manners may exist.

When a user identifies the predetermined track, this will usually be when the track is provided, such as on a set of speakers, a stereo, a radio, a portable media player, a mobile phone or the like. In this situation, the stereo/radio/player/phone may have a button, a menu option or the like adapting the user to identify the track and initiate the method.

Alternatively, the track may be identified by entering identification thereof (keyboard, speech recognition or the like) into a suitable apparatus which may then derive this information and initiate the method. Naturally, more complex methods may be used, such as identifying an image or bar code representative of the track and deriving the information or ID therefrom.

Thus, the user identification normally or preferably is performed by or via a user operable element, such as a button, rotatable wheel, touch sensitive display, microphone, motion sensor, camera, bar code reader or the like.

Having now identified the predetermined track, the set of parameters/values either has to be determined or accessed as is discussed above.

As mentioned above, the vector representation, or the vectors, may be derived on the basis of the sets of parameters/values. This vector representation is independent of the predetermined track and primarily is dependent on the actual types of parameters/values and thus may be generated centrally or remotely. New tracks available may then be analyzed to derive the representative sets of parameters/values and then entered into the existing vector representation with the existing pivot points. Then, the predetermined track may already be represented in the vector representation.

Alternatively, it may be desired to provide a particular vector representation for this particular method or this particular predetermined track.

The vector representation will normally be stored in a storage medium, such as a RAM/ROM, hard disc, portable medium or the like. This may be at the user or remotely and accessible by LAN, WAN, WWW or the like.

The actual generation of the vector representation from the sets normally is performed by a processor, whether it being software controlled or in dedicated hardware, or a combination thereof. Again, this processor may be accessed by or operated by (owned by) the user or may be positioned remotely and not being accessible by or operable by the user.

As is the case for the generation of the vector representation, the distances may be determined remotely from the ID of the predetermined track, such as from a remotely generated and/or stored vector representation. In this situation, the ID of the predetermined track is merely forwarded to this remote site, and the distances or even the IDs of the identified number of tracks may be returned, if not the IDs of the similar tracks.

A number of different distance measures exist. The usual distance measure, however, is the Euclidian distance. These distances may be represented in any manner if generated at the user or returned to the user. Preferably, a distance from the vector of the predetermined track to all tracks of the vector representation is determined.

The identification of the predetermined, number of vectors or tracks may be performed in a number of manners and on the basis of fewer or more tracks. The better the similarity measure of the distances is, the fewer tracks/vectors need be identified for further processing. The better the mapping of the original similarity space to vectors is, the fewer tracks/vectors need to be identified for further processing. Better mapping means that very similar objects found with the original music similarity measure are close to each other in the vector space too.

Naturally, the predetermined number of vectors/tracks may be a percentage of the total number of tracks in the vector representation, a fixed number of tracks altogether, or any other number. Also, this number may be made dependent on the distribution of the distances, so that all tracks with a distance less than a percentage of the largest distance may be identified.

Subsequently, a further analysis is performed to identify the one or more similar tracks. As mentioned above, such analysis may be performed on the basis of any desired algorithm. Also, the analysis may be performed locally or remotely but usually on a processor (software controllable and/or dedicated hardware).

In one embodiment, the generating means are adapted to map the sets into a k-dimensional Euclidean vector space by:
for each dimension, k, identifying two pivot points and calculating the vector for each set on the basis of the identified pivot points.

As mentioned above, a number of mapping methods exist, the preferred one being the FastMap method.

Then, the generating means preferably is adapted to identify the two pivot points by:
a) selecting one of the sets,
b) determining, for each other set than the selected set, a first distance, along the pertaining dimension, from the selected set to the other set,
c) selecting a first pivot point as a set having a first distance less than 90% of the largest determined first distance,
d) determining, for each other set than that of the selected first pivot point, a second distance, along the pertaining dimension, from the selected first pivot point to the other set,
e) selecting a second pivot point as a set having a second distance less than 90% of the largest determined second distance.

Again, the sets may include the sets of all audio tracks including that of the predetermined track. This selection may be random.

As mentioned above, the use of distances different from the most extreme ones has advantages. Preferably, the distances are within the 25% and 75% quartiles.

Most preferably, the generating means are adapted to select the first pivot point as a set having a first distance at or near a median/mean/middle of the first distances and the second pivot point is selected as a set having a second distance at or near a median/mean/middle of the second distances.

In a preferred embodiment, the generating means are adapted to determine the distance on the basis of a Kullback-Leibler divergence between the two pertaining sets, even though any similarity measure, such as those mentioned above may be used. Naturally, as is also described above, the KL may be the symmetric KL or even the square root of the SKL.

Preferably, the generating means are adapted to calculate the vector on the basis of a square root of a symmetric Kullback-Leibler divergence between the pertaining sets.

Also the similarity determination on the identified tracks may be performed using any similarity measure. However, it is preferred that the performing means are adapted to determine the similarity by determining a Kullback-Leibler divergence between the sets of the predetermined track and each of the identified other tracks. Again, the SKL may be preferred.

A third aspect of the invention relates to a method of representing similarities between a plurality of audio tracks, the method comprising generating a vector representation of the audio tracks, each track being represented by a set of n coefficients or values. Preferably, the mapping is performed on the basis of a similarity measure so that individual distances in the representation represent similarity between the pertaining sets/vectors/tracks.

This method may be carried out locally at the users or centrally/remotely where it is accessed by the user via e.g. a LAN, WAN and/or the WWW. Alternatively, the user may forward an ID or parameters/values for the track, or the actual track itself, and the full analysis be performed remotely.

As mentioned above, preferably, the generating step comprises mapping the sets into a k-dimensional Euclidean vector space by:
for each dimension, k, identifying two pivot points and calculating the vector for each set on the basis of the identified pivot points.

An adapted Fastmap method of generating the vector representation is preferred, wherein the two pivot points are identified by:
a) selecting one of the sets,
b) determining, for each other set than the selected set, a first distance, along the pertaining dimension, from the selected set to the other set,
c) selecting a first pivot point as a set having a first distance less than 90% of the largest determined first distance,
d) determining, for each other set than that of the selected first pivot point, a second distance, along the pertaining dimension, from the selected first pivot point to the other set,
e) selecting a second pivot point as a set having a second distance less than 90% of the largest determined second distance.

In the most preferred embodiment, the first pivot point is selected as a set having a first distance at or near a median/mean/middle of the first distances and the second pivot point is selected as a set having a second distance at or near a median/mean/middle of the second distances.

Also, in a preferred embodiment, steps b) and e) comprise determining the distance on the basis of a Kullback-Leibler divergence, symmetric or not. Also, the determination may be made on the basis of a square root of the KL or the SKL.

Preferably, the vector is calculated on the basis of a square root of a symmetric Kullback-Leibler divergence between the pertaining sets.

A fourth and final aspect of the invention relates to a representation of similarities between a plurality of audio tracks, the representation being a vector representation of sets of n coefficients or values, each set representing one of the tracks.

Preferably, the representation is a mapping into a k-dimensional Euclidean vector space.

In the following, preferred embodiments of the invention will be described with reference to the drawings, wherein:

FIG. 1 illustrates the effects of modifications improving the filter-and-refine method.

FIG. 2 evaluates different parameter combinations of k and filter-size and their impact on nearest neighbour (NN) recall and computational cost.

DATA

Figure 1:
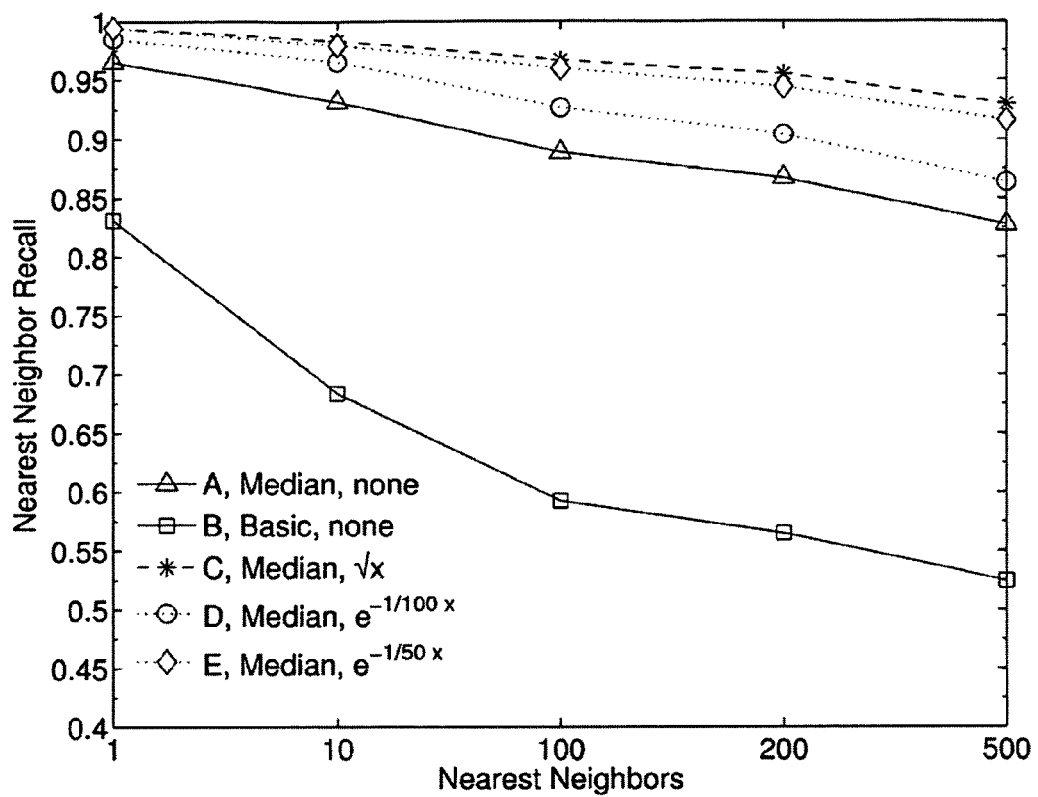

Throughout the following example we use a collection of 30 second snippets of 2.5 million songs to evaluate the performance and to show the practical feasibility of our approach.

Similarity

We extract timbre features from the snippets and compute a single Gaussian timbre representation using the method proposed by Mandel & Ellis in "Song-level features and support vector machines for music classification" in Proceedings of the 6$^{th}$ International Conference on Music Information Retrieval (ISMI095), London, UK, 2005. 25 Mel Frequency Cepstrum Coefficients (MFCCs) are computed for each audio frame, so that a Gaussian timbre model×finally consists of a 25-dimensional mean vector μ and a 25×25 covariance matrix Σ. For performance reasons we also pre-compute and store the inverted covariance matrix $\Sigma^{-1}$.

To compute acoustic timbre similarity, the symmetrized version (SKL) of the Kullback-Leibler divergence (KL, W. Penny, "KL-Divergences of Normal, Gamma, Dirichlet and Wishart densities", Wellcome Department of Cognitive Neurology, University College London, 2001) is used, defined between two multivariate normal distributions $x_1 \sim \mathcal{N}(\mu_1, \mu_1)$ and $x_2 \sim \mathcal{N}(\mu_2, \Sigma_2)$:

$$SKL(x_1, x_2) = \tfrac{1}{2} KL(x_1, x_2) + \tfrac{1}{2} KL(x_2, x_1) \quad (1)$$

A query for similar songs is processed in a linear scan by computing the SKL between the Gaussian $x_1$ of the seed song and all other songs in the database. The songs with the lowest divergence to the seed song are its nearest neighbours and possible recommendations.

Nearest Neighbour Recall

To compare the effectiveness of the nearest neighbour retrieval variants evaluated, we use what we call nearest neighbour (NN) recall. We define it as the ratio of true nearest neighbours found by some algorithm ($NN_{found}$) to the real number of true nearest neighbours ($NN_{true}$) as computed by an exhaustive search.

$$\text{Recall} = |NN_{found} \cap NN_{true}| / |NN_{true}| \quad (2)$$

The Method

To build the preferred filter-and-refine method for fast similarity queries, an adapted version of FastMap (C. Faloutsos akd K. Lin, "FastMap: a fast algorithm for indexing data-mining and visualization of traditional and multimedia datasets", in Proceedings of the 1995 ACM SIGMOD international conference on management of data. ACM New York, N.Y., USA, 1995, pp 163-174) is used, which is a Multidimensional Scaling (MDS) technique. MDS is a widely used method for visualizing high-dimensional data. It takes the distance matrix of a set of items as input and maps the data to vectors in an arbitrary-dimensional Euclidean space. Fast- Map is straightforward to use even for large databases since it only needs a low and constant number of rows of the similarity matrix to compute the vector mapping. However, FastMap requires the distances to adhere to metric properties.

Original FastMap

The original FastMap algorithm uses a simple mapping formula (Equation 3) to compute a k-dimensional projection of objects into the Euclidean vector space. The dimension k is arbitrary and can be chosen as required. Usually, higher dimensions yield a more accurate mapping of the original similarity space.

To project objects into a k-dimensional Euclidean vector space, first two pivot objects have to be selected for each of the k dimensions. The original algorithm uses a simple random heuristic to select those pivot objects: for each dimension (j=1 . . . k), (1) choose a random object $x_r$ from the database, (2) search for the most distant object of $x_r$ using the original distance measure D( ) and select it as the first pivot object $x_{j,1}$ for the dimension, (3) the second pivot object $x_{j,2}$ is the object most distant to $x_{j,1}$ in the original space.

After the 2k pivot objects have been selected, the vector representation of an object x is computed by calculating $F_j(x)$ for each dimension (j=1 . . . k):

$$F_j(x)=(D(x,x_{j,1})^2+D(x_{j,1},x_{j,2})^2-D(x,x_{j,2})^2)/2D(x_{j,1},x_{j,2}) \quad (3)$$

This method depends on metric properties of D to produce meaningful mappings. However, it has been noted that FastMap works surprisingly well also for non-metric divergence measures.

As FastMap only requires a distance function D and pivot objects to compute the vector mapping, it can be instantly applied to map the Gaussian timbre models with the SKL as distance function to Euclidean vectors (ignoring the fact that the SKL is not metric).

The Filter-and-Refine Method Using Fastmap

To use FastMap to quickly process music recommendation queries, we initially use it to map the Gaussian timbre models to k-dimensional vectors. In a two step filter-and-refine process we then use those vectors as a prefilter: given a query object we first filter the whole collection in the vector space (with the squared Euclidean distance) to return a number (filter-size) of possible nearest neighbours. We then refine the result by computing the exact SKL on the candidate subset to return the nearest neighbours. By using the SKL to refine the results, the correct nearest neighbour ranking is ensured. We set the parameter filter-size to a fraction of the whole collection.

Since the complexity of a single SKL comparison is much higher than a simple vector comparison, the use of the squared Euclidean distance to pre-filter the data results in large speedups compared to a linear scan over the whole collection using the SKL. Table 1 compares the computational cost (in floating point operations, flops) of the SKL to the squared Euclidean distance $d^2$ using different vector dimensions (k) to pre-filter candidate nearest neighbours.

TABLE 1

| Divergence | flops | flops/flops$_{SKL}$ |
|---|---|---|
| SKL | 3552 | 1 |
| $D^2$, k = 20 | 60 | 0.017 |
| $D^2$, k = 40 | 120 | 0.034 |
| $D^2$, k = 60 | 180 | 0.051 |

Table 1 illustrates the computational complexity (flops) of computing the squared Euclidean distance ($d^2$) is, even for high mapping dimensions like k=60, much lower than the cost of computing a single SKL comparison.

Modifications

Two modifications may be made to improve the quality of FastMap mappings for nearest neighbour retrieval. The modifications are centred around two thoughts: (1) a metric divergence measure would produce better vector mappings, and (2) a more specialized heuristic for pivot object selection could produce better mappings especially for the near neighbours, which are at the centre of our interest.

Rescaling

Before mapping the objects $x_i \in X$ to a k-dimensional vector (Equation 3), the original symmetric Kullback-Leibler divergences (SKL) are rescaled by taking the square-root:

$$D(x_1,x_2)=\sqrt{SKL(x_1,x_2)} \quad (4)$$

This rescaling has the effect of making the SKL behave more like a metric. As the SKL already has the important properties of being symmetric and non-negative, it only fails to fulfill the triangle inequality. Taking the square root has the effect of fixing the divergence, making it more metric. Another more common way is to rescale the SKL with $e^{\lambda SKL(\ )}$.

The effect of rescaling on a collection of 100.000 randomly drawn Gaussian timbre models (Table 2) has been experimentally verified by checking the triangle inequality for all possible triples. The table clearly shows that exponentiating indeed reduces the number of cases where the triangle inequality is violated, but it does not work as well as taking the square root, which makes the SKL obey the triangle inequality in more than 99% of the cases in our experimental setup.

TABLE 2

| Divergence | % triangle inequality |
|---|---|
| SKL( ) | 91.57% |
| $1-e^{\lambda SKL(\ )}, \lambda = -1/100$ | 93.71% |
| $1-e^{\lambda SKL(\ )}, \lambda = -1/50$ | 95.60% |
| $\sqrt{SKL(\ )}$ | 99.32% |

Table 2 illustrates the percentage of Gaussian object triples fulfilling the triangle inequality ($D(x,z) \leq D(x,y)+D(y,z)$) with and without rescaling. The triangle inequality was checked for all possible triples in a collection of 100.000 randomly selected Gaussian timbre models.

Pivot Object Selection

To select the pivot objects which are needed to map an object x to a vector space, the original algorithm uses two objects for each dimension which lie as far away from each other as possible. In contrast to the original heuristic we select the pivot objects using an adapted strategy: (1) first we randomly select an object $x_r$ and compute the distance to all other objects; (2) we then select the first pivot object $x_1$ to be the object lying at the distance median, i.e. the object at the index i=[N/2] on the sorted list of divergences; (3) likewise, the second pivot object $x_2$ is selected to be the object with the distance median of all divergences from $x_1$ to all other objects.

By using pivot objects at the median distance we avoid using objects with extremely high divergence values which often occur in the divergence tails when using the SKL. Since we are particularly interested in optimally mapping the near neighbours and not the whole divergence space, this strategy should also help in preserving the neighbourhoods.

Improvements

Finally, we measure how these modifications improve the filter-and-refine method by experimentally computing the nearest neighbour (NN) recall of each change on a 100.000 songs collection. FIG. 1 shows the result of the experiment. A huge improvement in the nearest neighbour recall can be seen for all strategies which use the median pivot object selection heuristic (A, C, D, E) compared to the original FastMap heuristic (B). The figure also shows that rescaling the SKL values helps to further increase the NN recall. The preferred strategy (C) using the median pivot object selection strategy together with square-root-rescaling gives the best results.

Implementation

The implementation of the filter-and-refine music recommendation engine is straightforward: in an initial step the whole collection is pre-processed with the proposed mapping method, transforming the database objects into a k-dimensional vector space. This is a linear process since only 2 k pivot objects have to be selected and each object in the database is mapped to a vector once, using Equation 3. Our implementation saves the pivot objects for each dimension and the vector mappings to disk. This allows fast restarting of the system and easy processing of new objects.

To query for similar objects we use the previously described filter-and-refine method, filtering out a predefined number (filter-size, a percentage of the collection size) of nearest neighbor candidates using the vector representation and refining the result with the exact SKL.

This outlines the general method, but obviously two parameters which have an impact on the retrieval quality (nearest neighbour (NN) recall) and the query speed have not been discussed yet: the number of vector dimensions k and the filter-size.

Recall and Speed

It is obvious that a larger filter-size results in better NN recall values but higher computational costs. Likewise, a higher k used for the vector mapping results in a more accurate mapping of the divergence space, but with each dimension the computational costs to compute the squared Euclidean distance in the pre-filter steps are increased.

Figure 2:
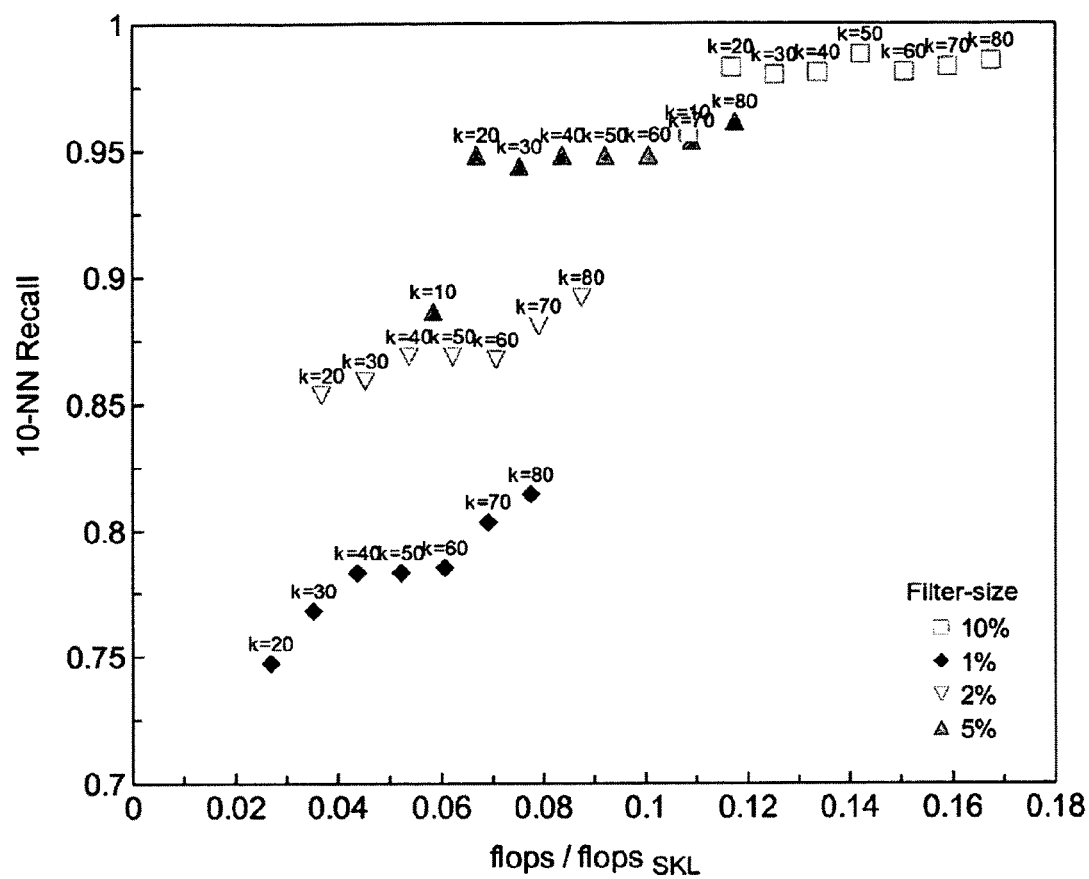

FIG. 2 evaluates different parameter combinations of k and filter-size and their impact on nearest neighbour recall and computational cost (and thus query speed). The diagram was compiled using a collection of 100.000 Gaussian timbre models. It shows the 10-NN retrieval recall and query speed (computational cost in terms of flops).

The figure shows that a parameter combination of k=20 and filter-size=5% can be selected to achieve about 95% 10-NN recall. That combination would take only 7% of the query time required by a linear scan with the SKL. If a 10-NN recall of 85% is acceptable a parameter combination requiring only 3.5% the computational cost of a linear scan is possible (k=20 and filter-size=2%). Almost perfect 10-NN recall values (>98-99%) can be reached when setting filter-size to about 10% of the collection size, which still requires only 11% of the time a linear scan would need.

Figure 3:
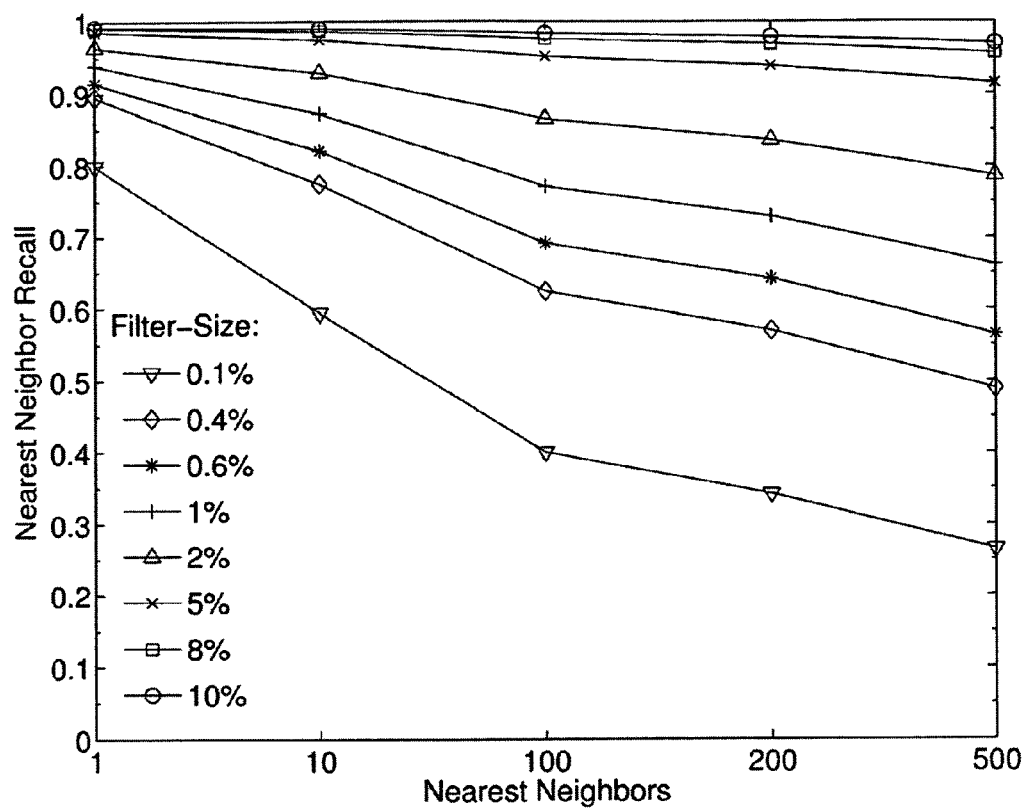
FIG. 3 illustrates NN recall with different filter-sizes evaluated with 25.000 songs on the 2.5 million songs collection using the combined similarity measure.
Figure 4:
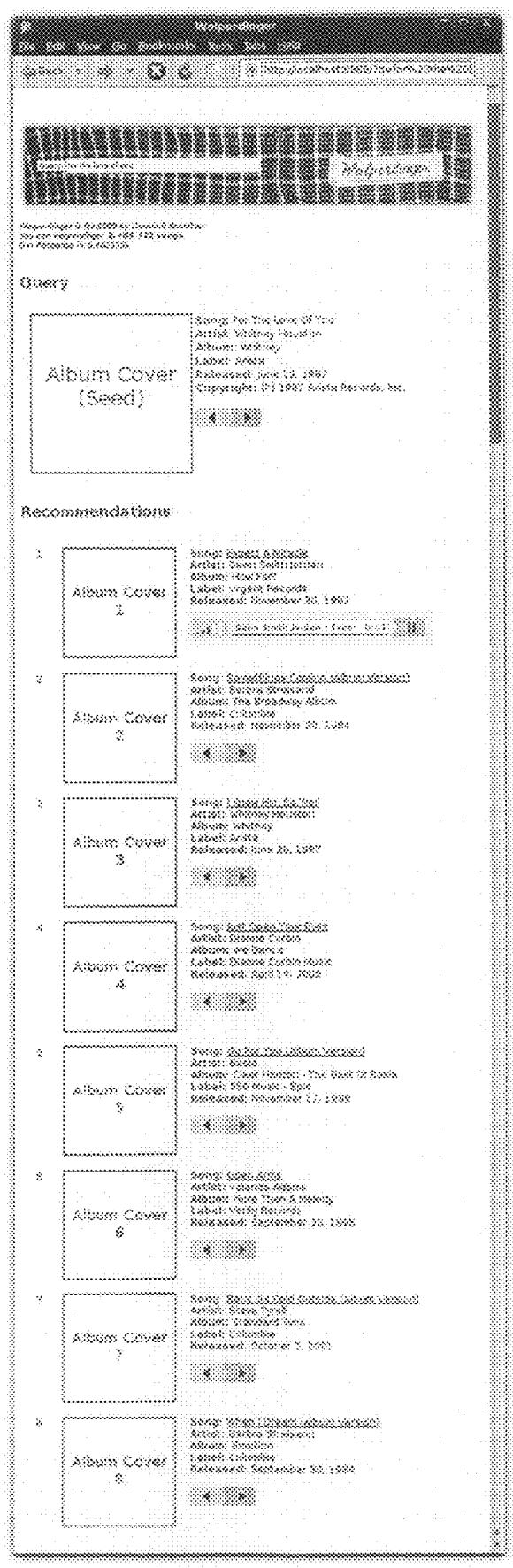
FIG. 4 illustrates a prototype web music-recommendation system displaying eight recommendations computed on a collection of 2.5 million tracks.

This evaluation shows how a good parameter combination for a collection should be selected. FIG. 3 illustrates a similar diagram illustrating how to select the best parameters for a 2.5 million song collection, achieving 99% 1-NN, 98% 10-NN and 95% 100-NN recall on the collection. FIG. 3 illustrates NN recall with different filter-sizes evaluated with 25.000 songs on the 2.5 million songs collection using the combined similarity measure. With a filter-size of 5% one can achieve 96% 100-NN recall and 98% 10-NN and 99% 1-NN recall. k=40.

Errors

Another aspect which is of interest is how falsely reported nearest neighbours (false positives) affect the average quality of the music recommendations. To quantify the effect, we have done a nearest neighbour genre classification experiment with and without the filter-and-refine method. A genre classification experiment is a standard evaluation to test the quality of a music recommendation algorithm. It assumes that each song in a music collection is labeled with a genre. A nearest neighbour classifier is then used to compute the genre classification accuracy, the ratio of correctly classified tracks to the total number of tracks. In each query we exclude songs from the same artist, as this leads to overly optimistic genre classification results.

We tested four different collections (three in-house collections and the Ismir 2004 Magnatune music collection which is freely available for testing purposes). Table 3 summarizes the results. It appears that the errors which are being made do not affect the classification accuracy in an adverse way. Classification accuracy decreases only by about 0.1% for the two larger collections and by about 0.5% for the two small collections.

TABLE 3

| Collection, size | Genres | F&R | Full Scan |
|---|---|---|---|
| #1, N = 16781 | 21 | 30.17% | 30.28% |
| #2, N = 9369 | 16 | 28.55% | 28.66% |
| #3, N = 2527 | 22 | 28.27% | 28.78% |
| Ismir 2004, N = 729 | 6 | 64.47% | 64.88% |

Table 3 illustrates 1-NN genre classification experiment results (with artist filter) on four different collections. The table compares the present genre classification accuracy of the filter-and-refine (F&R) approach with a full exact linear scan. Parameters: k=40, filter-size=5%

Combined Music Similarity Measures

Besides using single Gaussian timbre models and the SKL to compute acoustic music similarity, recent approaches enhance the quality of a music similarity measure by mixing multiple similarity components. For example, the single Gaussian timbre models may be combined with rhythmic structures to better capture more aspects of similarity.

Below, the applicability is described of the previously proposed method to a similarity measure which linearly combines the SKL with rhythmic similarity using Fluctuation Patterns (FPs) as described in E. Pampalk, A. Rauber and D. Merkl, "Content-based organization and visualization of music archives", Proceedings of the tenth ACM international conference on multimedia, ACM New York, N.Y., USA, 2002, pp 570-579. Fluctuation Patterns describe the amplitude modulation of the loudness per frequency band. The implementation outlined in is used to compute the FPs: (1) cutting an MFCC spectrogram into three second segments, (2) using an FFT to compute amplitude modulation frequencies of loudness (range 0-10 Hz) for each segment and frequency band, (3) weighting the modulation frequencies based on a model of perceived fluctuation strength, (4) applying filters to emphasize certain patterns and smooth the result. The resulting FP is a 12 (frequency bands according to 12 critical bands of the Bark scale (see H. Fastl and E Zwicker, Psychoacoustics: facts and models", springer-Verlag, New York Inc. 2007) times 30 (modulation frequencies, ranging from 0 to 10 Hz) matrix for each song. The distance between two FPs $x_i$ and $x_j$ is computed as the Euclidean distance (ED):

$$ED(x_i, x_j) = \sum_{k=1}^{12} \sum_{l=1}^{30} \left(x_i^{k,l} - x_j^{k,l}\right)^2 \quad (5)$$

To linearly combine the two similarity measures, each distance is normalized to unit variance. To do so we compute the standard deviation ($\sigma$) for each distance measure on an independent test collection. The final combined similarity measure is defined as:

$$SKL \& ED(x_1, x_2) = 0.7 \frac{\sqrt{SKL(x_1, x_2)}}{\sigma_{\sqrt{SKL}}} + 0.3 \frac{ED(x_1, x_2)}{\sigma_{ED}} \quad (6)$$

The weights of the combined measure (0.7 for the timbre- and 0.3 for the rhythmic-component) were selected. In a genre classification experiment we show that the combined measure indeed performs better (see Table 4). Music genre classification accuracy increases in all four tested collections by up to 3.5% compared to the results of the previous evaluation using only the SKL as similarity measure (Table 3).

TABLE 4

| Collection, size | Genres | F&R | Full Scan |
|---|---|---|---|
| #1, N = 16781 | 21 | 31.21% | 31.29% |
| #2, N = 9369 | 16 | 31.97% | 32.10% |
| #3, N = 2527 | 22 | 31.16% | 31.04% |
| Ismir 2004, N = 729 | 6 | 65.57% | 65.57% |

Table 4 illustrates 1-NN genre classification experiment results (with artist filter) for the combined similarity measure SKL&ED. Genre classification accuracy increases in all collections, compared to the evaluation done in Table 3, which used just the SKL. k=40, filter-size=5%

Filter-And-Refine

The proposed F&R method can be applied to the combined similarity measure SKL&ED without any modifications. We use the previously introduced median pivot object selection strategy to select good pivot objects for FastMap using the combined measure. In addition to that we use a rescaled variant of the SKL in the linear combination (Equation 6) to increase the cases the SKL and thus the SKL&ED behaves like a metric. This property is discussed in the next paragraphs.

The triangle inequality is defined between the distances of three points: $D(x,z) \leq D(x,y) + D(y,z)$. It is a basic property of every metric distance measure. This inequality can be easily shown to also hold for any linear combination of two metric distances measures $D_1$ and $D_2$:

$$\alpha_1 D_1(x,y) + \alpha_2 D_2(x,y) \leq \alpha_1(D_1(x,y) + D_1(y,z)) + \alpha_2(D_2(x,y) + D_2(x,y)) \quad (7)$$

Therefore it is clear that a linear combination of a non-metric (i.e. SKL) and a metric distance (i.e. Euclidean) could only violate the triangle inequality where the non-metric measure does. Since we have experimentally shown that rescaling the SKL by taking the square root makes the divergence almost metric, the linear combination inherits this property and should deliver comparable results with Fast-Map.

In a genre classification experiment (see Table 4) it is seen that the F&R approach indeed works well with the combined similarity measure. Like in Table 3 it can be seen that the genre classification accuracy decreases only very little with the F&R method (0.1%); in one collection the approximative method even returns better results than a full exact search.

Figure 5:
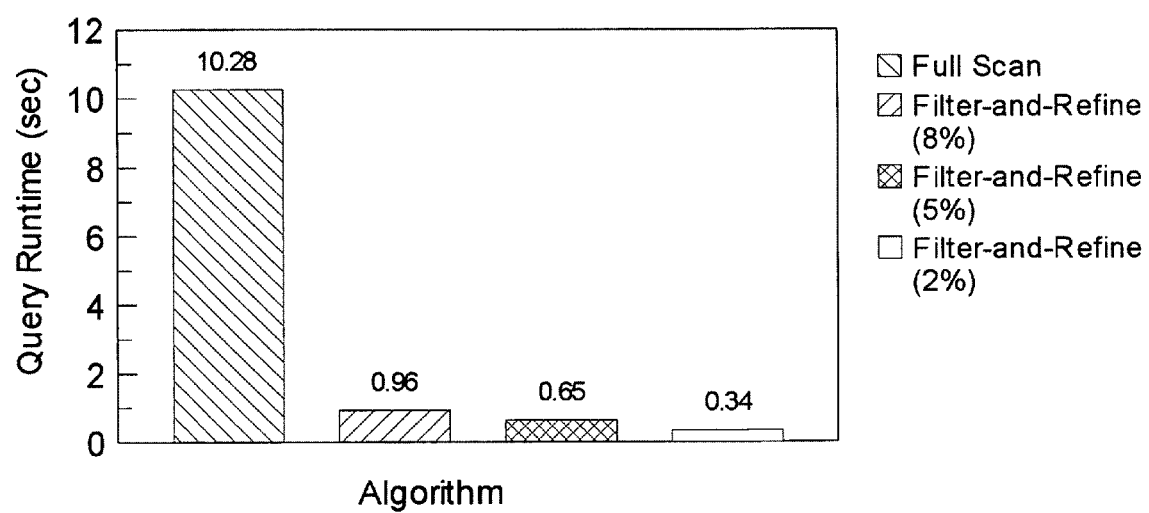
FIG. 5 illustrates a comparison of the time it takes to query a 2.5 million song collection for nearest neighbours using a full scan compared to a scan using the proposed filter-and-refine method.

FIG. 5 illustrates a comparison of the time it takes to query a 2.5 million song collection for nearest neighbours using a full scan compared to a scan using the proposed filter-and-refine method. A single CPU core of a standard Intel Core Duo SPU (2.5 GHz) was used and all Gaussian timbre models/Fluctuation Patterns were loaded to RAM.

The invention claimed is:

1. A computer-implemented method of identifying a one or more audio tracks similar to a first audio track, each audio track being represented by a set of a coefficients or values, the method comprising:
    generating an initial representation of the set of n coefficients or values, the initial representation comprising a Gaussian timbre representation of each track;
    generating, by a processor, a vector of the set of each audio track so as to determine the vector for each audio track, wherein the generating a vector comprises mapping the set into a k-dimensional Euclidean vector space by:
        identifying two pivot points for each dimension, k; and
        calculating the vector for the set on a basis of the identified pivot points on the basis of a square root of a symmetric Kullback-Leibler divergence between the pivot points and the set;
    determining a distance in the vector space, from a vector of the first audio track to the vector for each set;
    identifying a number of audio tracks by selecting number of vectors having the smallest distances to the vector of the first audio track;
    performing a similarity determination between the first audio track and each identified audio track and;
    identifying the one or more similar audio tracks.

2. The method according to claim 1, wherein the two pivot points are identified by:
    a) selecting one of the sets,
    b) determining, for each other set than the selected set, a first distance, along the pertaining dimension, from the selected set to the other set,
    c) selecting a first pivot point as a set having a first distance less than 90% of the largest determined first distance,
    d) determining, for each other set than that of the selected first pivot point, a second distance, along the pertaining dimension, from the selected first pivot point to the other set,
    e) selecting a second pivot point as a set having a second distance less than 90% of the largest determined second distance.

3. The method according to claim 2, wherein the first pivot point is selected as a set having a first distance at one of a first median/mean/middle of the first distances and the second pivot point is selected as a set having a second distance at one of a second median/mean/middle of the second distances.

4. The method according to claim 2, wherein steps b) and e) comprise determining the distance on the basis of a Kullback-Leibler divergence.

5. The method according to claim 1, the performing a similarity determination comprising determining a Kullback-Leibler divergence between the sets of the predetermined track and each of the identified other tracks.

6. An apparatus for identifying one or more audio tracks similar to a first audio track, the apparatus comprising:
- computer means for accessing sets of n coefficients or values, each set representing an audio track;
- computer means for identifying the first audio track;
- computer means for generating an initial representation of the set of n coefficients or values, the initial representation comprising a Gaussian timbre representation of each track;
- processor means for generating or accessing a vector of the set of each audio track so as to determine the vector for each audio track, wherein the processor means for generating is configured to map the set into a k-dimensional Euclidean vector space by:
  - identifying two pivots points for each dimension, k; and
  - calculating the vector for each set on a basis of the identified pivot points on the basis of a symmetric Kullback-Leibler divergence between the identified pivot points and set;
- computer means for determining or accessing a distance, in the vector space, from a vector of the first audio track to the vector for each set;
- computer means for identifying a number of audio tracks by selecting a number of vectors having the smallest distances to the vector of the first audio track; and
- computer means for performing a similarity determination between the first audio track and the identified number of audio tracks and identifying the one or more similar tracks.

7. The apparatus according to claim 6, wherein the processor means for generating is configured to identify the two pivot points by:
- a) selecting one of the sets,
- b) determining, for each other set than the selected set, a first distance, along the pertaining dimension, from the selected set to the other set,
- c) selecting a first pivot point as a set having a first distance less than 90% of the largest determined first distance,
- d) determining, for each other set than that of the selected first pivot point, a second distance, along the pertaining dimension, from the selected, first pivot point to the other set,
- e) selecting a second Divot point as a set having a second distance less than 90% of the largest determined second distance.

8. The apparatus according to claim 7, wherein the processor means for generating is configured to select the first pivot point as a set having a first distance at one of a first median/mean/middle of the first distances and the second pivot point is selected as a set having a second distance at one of a second median/mean/middle of the second distances.

9. The apparatus according to claim 7, wherein the processor means for generating is configured to determine the distance on the basis of a Kullback-Leibler divergence.

10. The apparatus according to claim 6, wherein the computer means for performing is configured to determine the similarity by determining a Kullback-Leibler divergence between the sets of the first track and each of the identified number of audio tracks.

11. A method of representing similarities between a plurality of audio tracks, each track being represented by a set of n coefficients or values, the method comprising:
- generating an initial representation of the set of n coefficients or values of the tracks, the initial representation comprising Gaussian timbre representation of each track, and
- generating, by a processor, a vector of the set of each audio track so as to determine the vector for each audio track mapping the sets into a k-dimensional Euclidean vector space by:
  - identifying two pivots points for each dimension, k; and
  - calculating the vector for each set on a basis of the identified pivot points on the basis of a square root of a symmetric Kullback-Leibler divergence between the identified pivot points and the set;
- wherein the two pivot points are identified by:
  - a selecting one of the sets,
  - b) determining, for each other set than the selected set, a first distance, along the pertaining dimension, from the selected set to the other set,
  - c) selecting a first pivot point as a set having a first distance less than 90% of the largest determined first distance,
  - d) determining, for each other set than that of the selected first pivot point, a second distance, along the pertaining dimension, from the selected first pivot point to the other set, and
  - e) selecting a second pivot point as a set having as second distance less than 90% of the largest determined second distance.

12. The method according to claim 11, wherein the first pivot point is selected as a set having a first distance at one of a first median/mean/middle of the first distances and the second pivot point is selected as a set having a second distance at one of a second median/mean/middle of the second distances.

13. The method according to claim 11, wherein steps b) and e) comprise determining the distance on a basis of a Kullback-Leibler divergence.

\* \* \* \* \*